US007624281B2

(12) United States Patent
Mehta et al.

(10) Patent No.: US 7,624,281 B2
(45) Date of Patent: Nov. 24, 2009

(54) SYSTEM AND METHOD FOR PROVIDING ACCESS TO A KEYBOARD VIDEO AND MOUSE DRAWER USING BIOMETRIC AUTHENTICATION

(75) Inventors: Raghav Mehta, Streetsboro, OH (US); Justin Gierke, Lakewood, OH (US)

(73) Assignee: Video Products, Inc., Aurora, OH (US)

( * ) Notice: Subject to any disclaimer, the term of this patent is extended or adjusted under 35 U.S.C. 154(b) by 767 days.

(21) Appl. No.: 11/006,085

(22) Filed: Dec. 7, 2004

(65) Prior Publication Data

US 2009/0222670 A1  Sep. 3, 2009

(51) Int. Cl.
*G06F 21/04* (2006.01)
(52) U.S. Cl. .......................... 713/186; 713/153; 726/21; 726/28; 726/34
(58) Field of Classification Search ................. 713/153, 713/186; 705/21, 28, 34; 725/21, 28, 34; 726/21, 25, 34
See application file for complete search history.

(56) References Cited

U.S. PATENT DOCUMENTS

| | | | |
|---|---|---|---|
| 5,420,936 | A | 5/1995 | Fitzpatrick et al. |
| 5,719,950 | A | 2/1998 | Osten et al. |
| 6,141,719 | A | 10/2000 | Rafferty et al. |
| 6,219,439 | B1 | 4/2001 | Burger |
| 6,282,304 | B1 | 8/2001 | Novikov et al. |
| 6,324,605 | B1 | 11/2001 | Rafferty et al. |
| 6,332,193 | B1 | 12/2001 | Glass et al. |
| 6,378,009 | B1 | 4/2002 | Pinkston, II et al. |
| 6,483,929 | B1 | 11/2002 | Murakami et al. |
| 6,487,662 | B1 | 11/2002 | Kharon et al. |
| 6,567,869 | B2 * | 5/2003 | Shirley ........................ 710/62 |
| 6,609,034 | B1 * | 8/2003 | Behrens et al. ............... 700/19 |
| 6,618,806 | B1 | 9/2003 | Brown et al. |
| 6,681,250 | B1 | 1/2004 | Thomas et al. |

(Continued)

FOREIGN PATENT DOCUMENTS

EP     0 923 018     6/1999

(Continued)

OTHER PUBLICATIONS

AlterPath™ Bio, Biometric Authentication Scanner, 2003 Cyclades Corporate.

(Continued)

*Primary Examiner*—Emmanuel L Moise
*Assistant Examiner*—Paul Callahan
(74) *Attorney, Agent, or Firm*—Renner, Otto, Boisselle & Sklar, LLP

(57) ABSTRACT

The present invention relates generally to a system and method for providing a user access to a Keyboard, Video, Mouse (KVM) drawer based upon biometric authentication of the user, and more particularly, to a system and method for providing a user access to at least one host computer associated with a KVM drawer based, at least in part, on the user's unique biometric data. In one embodiment, an emulation controller, which emulates a KVM switch, is enabled or disabled based upon whether the associated user is properly authenticated. In another embodiment, an input-output buffer is enabled or disabled based upon whether the associated user is properly authenticated. Methods are also provided wherein the storage device containing at least a portion of the biometric data associated with authorized users is enabled upon receiving biometric data associated with a user of the KVM drawer.

32 Claims, 6 Drawing Sheets

U.S. PATENT DOCUMENTS

| | | | |
|---|---|---|---|
| 7,284,278 B2 * | 10/2007 | Anson et al. | 726/34 |
| 2001/0045451 A1 | 11/2001 | Tan et al. | |
| 2002/0007459 A1 | 1/2002 | Cassista et al. | |
| 2002/0159571 A1 | 10/2002 | Stock | |
| 2002/0181747 A1 | 12/2002 | Topping | |
| 2003/0131127 A1 | 7/2003 | King et al. | |
| 2003/0191878 A1 | 10/2003 | Shirley | |
| 2003/0212709 A1 | 11/2003 | De Schrijver | |
| 2003/0226137 A1 | 12/2003 | Nagao | |
| 2005/0057916 A1 * | 3/2005 | Yu et al. | 362/84 |
| 2005/0149738 A1 * | 7/2005 | Targosky | 713/182 |
| 2005/0216620 A1 * | 9/2005 | Sandulescu et al. | 710/62 |

OTHER PUBLICATIONS

International Search Report and Written Opinion for International Application No. PCT/US05/044073 dated Apr. 28, 2006.

* cited by examiner

SYSTEM AND METHOD FOR PROVIDING ACCESS TO A KEYBOARD VIDEO AND MOUSE DRAWER USING BIOMETRIC AUTHENTICATION

TECHNICAL FIELD

The present invention relates generally to a system and method for providing a user with access to a Keyboard, Video, Mouse (KVM) drawer based upon biometric authentication of the user, and more particularly, to a system and method for providing a user with access to at least one host computer associated with a KVM drawer based, at least in part, on the user's unique biometric data.

BACKGROUND

Sensitive electronic equipment (e.g., computers, servers, networking equipment, etc.) are susceptible to a variety of environmental factors, including heat, static electricity and water. Accordingly, such equipment is typically stored in computer control rooms having a highly controlled environment. Computer control rooms generally include air conditioning, humidity control and raised flooring, to offset the effects of heat, static electricity, and potential flooding. Because of the highly controlled environment and other design considerations (e.g., cabling), computer control room space is generally much more expensive than normal office space.

In order to reduce storage requirements and the costs associated therewith, computer equipment (e.g., computers, servers, networking equipment, etc.) stored in computer control rooms are typically mounted in one or more racks. Racks generally house and store various equipment including computer servers, audio, telecommunication, security and other types of equipment in a vertical configuration or arrangement. In order to minimize the amount of horizontal space that is occupied or covered by computer equipment (e.g., the equipment's footprint), it is desirable for racks to house as much equipment as possible. The more equipment that is housed vertically in a rack, the less horizontal building space (i.e., square footage) is needed to house the equipment in a computer control room and less cost is incurred as a result.

While racks may greatly reduce the required size of a computer control room, it is inconvenient to have separate video displays, input devices, and pointing devices for each computer stored in a rack or in a computer control room. Accordingly, keyboard-video-mouse (KVM) switches are gaining increasing popularity in such environments.

A KVM system may be implemented by utilization of a KVM drawer. A KVM drawer is a keyboard, video monitor and mouse device that is generally supported by a rack and can be housed within a rack when not in use. In most cases, the KVM drawer may be housed within a single unit of rack space. In use, the KVM draw may be extended from the rack in a horizontal direction similar to opening a cabinet drawer. Upon opening of the KVM drawer, a video monitor may be positioned to provide access to an associated user. The user generally is provided with access to user input devices, such as a keyboard and a pointing device (e.g., mouse).

Access to a KVM drawer (or KVM system) typically requires a user to enter a unique user identification (user ID) or user name and a password that is usually input from a keyboard associated with the terminal in which the user attempts to gain access to the KVM drawer. There are many shortcomings associated with this method of user authentication. For example, a user may voluntarily provide their user ID and password to others without detection from the system administrator. A user may also provide their user ID and password to others involuntarily by a third party eavesdropping on the user as he or she enters their user ID and password through a keyboard or a camera could be covertly installed to view a user as he or she types the their user ID and password into the keyboard. These security breaches can lead to unauthorized use of the KVM drawer, thereby allowing unauthorized users access to potentially confidential and sensitive information.

Due to the confidential and sensitive information typically associated with a KVM drawer and the potential for unauthorized users to gain access to such information, there is a need in the art for providing more sophisticated access security to a KVM drawer.

SUMMARY OF THE INVENTION

The present invention is directed to a system and method for providing a user access to a KVM drawer upon successful biometric authentication.

One aspect of the present invention relates to a system for permitting a user to access one or more host computers, the system including a KVM drawer including a video monitor, a user input device, and a pointing device, wherein the KVM drawer is supported by an associated rack; an emulation controller communicatively coupled to the KVM drawer and one or more host computers; an identification input device for receiving biometric data associated with an associated user; and an authentication device communicatively coupled to the emulation controller and to the identification input device, wherein the authentication device is capable of providing the associated user access to the one or more host computers based at least in part upon the biometric data received from the identification input device.

Another aspect of the present invention relates to a system for permitting a user to access one or more host computers, the system including: a KVM drawer including a video monitor, a user input device, and a pointing device, wherein the KVM drawer is supported by an associated rack; an input-output buffer communicatively coupled to the KVM drawer; an emulation controller communicatively coupled to the input-output buffer and one or more host computers; an identification input device for receiving biometric data associated with the user seeking access to the KVM drawer; and an authentication device communicatively coupled to the input-output buffer and to the identification input device, wherein the authentication device is capable of providing an associated user access to the one or more host computers based at least in part upon the received biometric data from the identification input device.

Another aspect of the present invention relates to a KVM drawer including: a video monitor housing for supporting a video monitor; a user input housing pivotally connected to the video monitor housing, wherein the user input housing includes at least one user input device and the user input housing is capable of being secured on an associated rack; the user input housing including a rear panel including one or more ports for communicatively coupling the video monitor and the at least one user input device to one or more host computers through an emulation controller; wherein access to the one or more host computers through the at least one of the user input device and the video monitor is controlled by an associated authentication device that provides an associated user access to the one or more host computers based at least in part upon information biometric data received from the associated user.

Another aspect of the present invention relates to a method for permitting a user to access one or more host computers based upon biometric data associated with an authorized user, the method including: requesting biometric data associated with a user in response to a user request for access to a KVM drawer, wherein the KVM drawer is capable of being stored on an associated rack; receiving the biometric data associated with the user of the KVM drawer; authenticating the biometric data associated with the user of the KVM drawer; providing the user access to at least one host computer device associated with the emulation controller.

Another aspect of the present invention relates to a method for permitting a user to access one or more host computers based upon biometric data associated with an authorized user, the method including: inputting biometric data associated with a user to an identification input device; enabling a storage device containing at least a portion of the biometric data associated with authorized users based on the inputting of biometric data at the identification input device; comparing at least a portion of the received biometric data with a stored set of biometric data associated with authorized users stored in a storage device; providing access to at least one host computer from a KVM drawer through an emulation controller based upon the step of comparing the received biometric data with the stored set of biometric data associated with authorized users.

Other systems, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF THE INVENTION

The present invention relates to a system and method for permitting a user to access one or more host computers through a KVM drawer based upon biometric data associated with the user.

Figure 1:
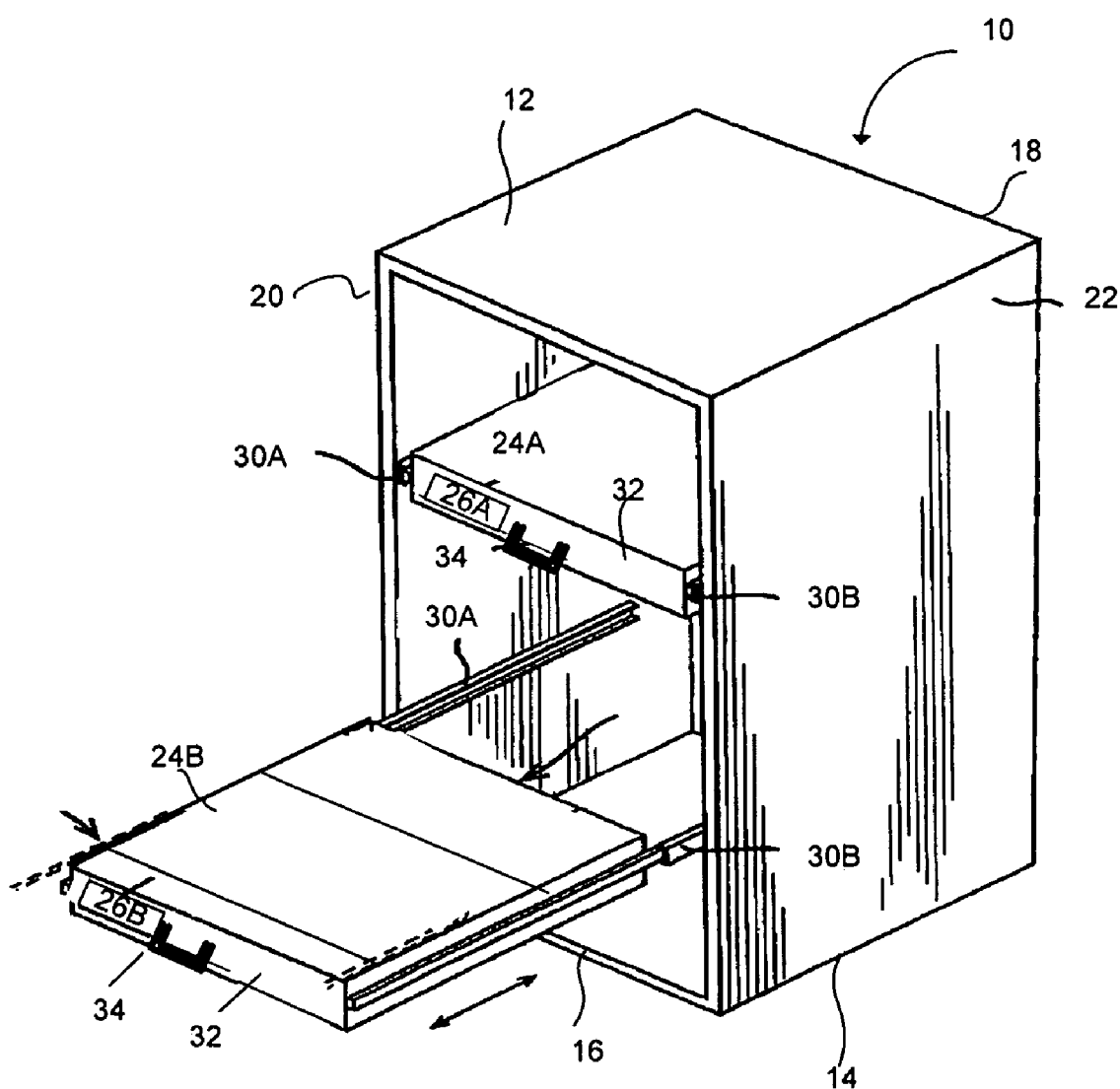
FIG. 1 is a front perspective view of a rack system to which aspects of the present invention can be applied.

Referring to FIG. 1, a rack storage system 10 is shown. The rack storage system 10 can be fabricated from steel or aluminum (or any other suitable material) and includes parallel vertical rails or rackrails (not shown) for storing rack components. The rails are positioned generally along the sides of the racks at the front and rear. The rack storage system 10 generally includes a top 12, bottom 14, front 16, rear 18 and sides 20 and 22. The rack storage system 10 may be a standard rack such as an EIA-310 compliant electronics equipment rack. As one of ordinary skill in the art would readily appreciate any suitable rack for supporting electronic equipment thereon may be used in accordance with the present invention.

As shown in FIG. 1, the rack storage system 10 includes a plurality of rack components 24$x$ (e.g., 24A and 24B) that may be secured by the rails. The rack components 24$x$ may include any type of electronic equipment (e.g., computers, servers, networking equipment, telephony equipment, KVM drawers, user stations, etc.). The rack storage system 10 supports and holds the rack components, as well as cabling associated therewith. Each rack component 24$x$ may include various indicators 26$x$ (e.g., 26A and 26B) associated therewith. Indicators 26$x$ may provide a representation of the status of the particular component (e.g., the indicators may be light emitting diodes that represent power being provided to the component 24$x$, whether the component is transmitting or receiving information, displays, meters, etc.).

Figure 2A:
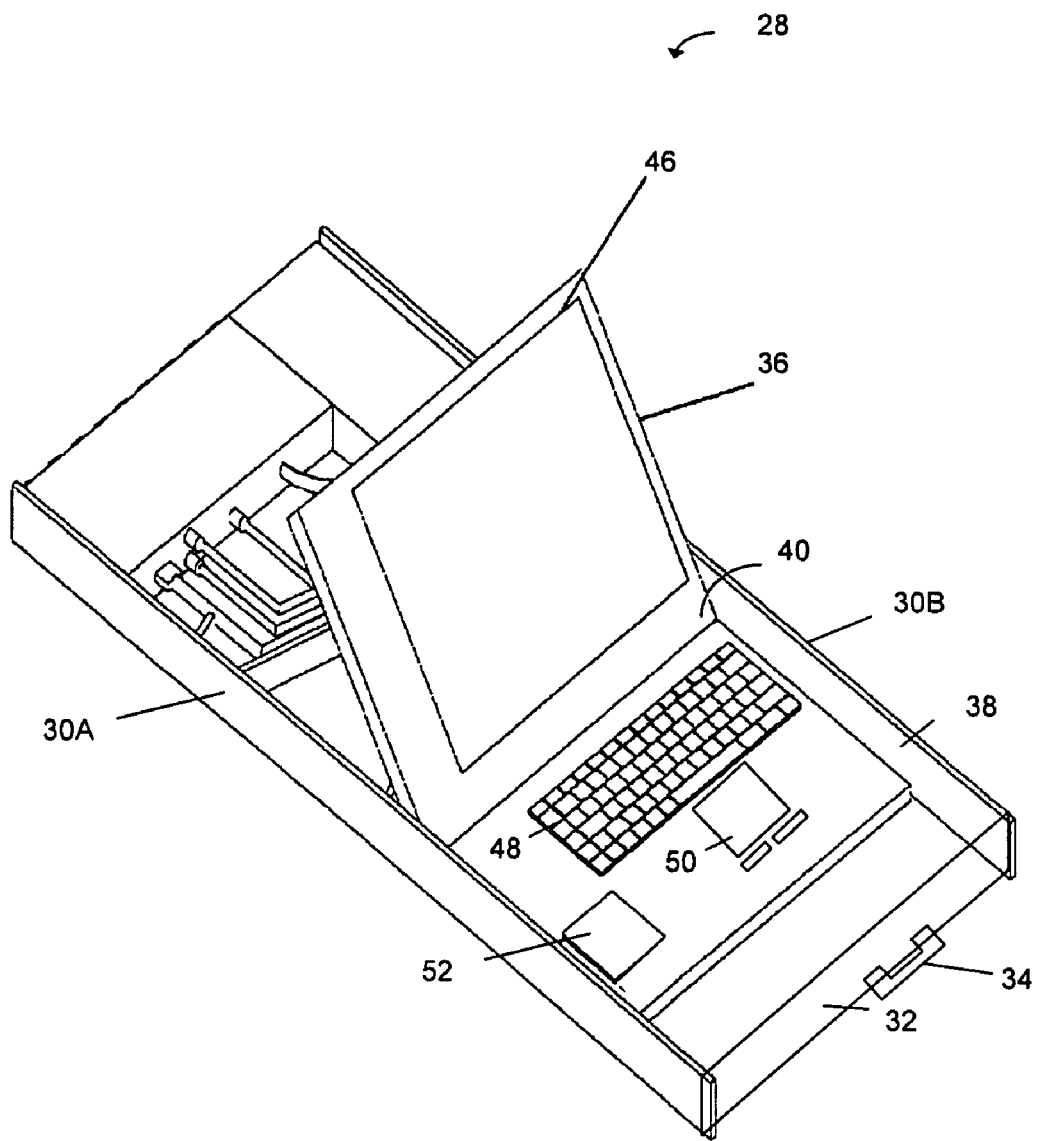
FIG. 2A is a front perspective view of an exemplary KVM drawer in accordance with one aspect of the present invention.

With additional reference to FIG. 2A, a rack component 24$x$ in the form of a KVM drawer 28 is shown. The KVM drawer 28 may be supported by the rack storage system 10. In one embodiment, the KVM drawer 28 is designed to be stored within the rack storage system 10 when not in use. The KVM drawer 28 may be easily accessible to the user when access to the KVM drawer 28 is needed. For example, the KVM drawer 28 may be secured to rails 30A and 30B. The rails 30A and 30B may be secured and supported to the rack storage system 10 by any suitable means. The KVM drawer 28 can also include a front panel 32 having a handle 34. The handle 34 works in cooperation with the rails 30A and 30B and the rack storage system 10 to enable the KVM drawer 28 to be easily positioned in a stowed position or a position that allows an associated user to access to the KVM drawer 28 (e.g., the KVM drawer 28 can be slid in and out of the rack storage system 10 in a drawer-like manner).

The KVM drawer 28 typically includes a video monitor housing 36 and a user input housing 38. The video monitor housing 36 and user input housing 38 may be integral or separate components. The video monitor housing 36 and the user input housing 38 may be connected together in any suitable manner (e.g., by a hinge 40). The hinge 40 allows for the video monitor housing 38 to be opened or closed depending on whether the KVM drawer 28 is to be used by an associated user or stored within the rack storage system 10. Since the KVM drawer 28 may be pulled out of the confines of the rack storage system 10 (or opened) in order to provide access for an associated user and the KVM drawer 28 may also be stored within the confines of the rack system 10 (or closed) when access is no longer needed, a KVM drawer 28 attached to the rack storage system 10 is commonly referred to in the art as a "drawer".

Figure 2C:
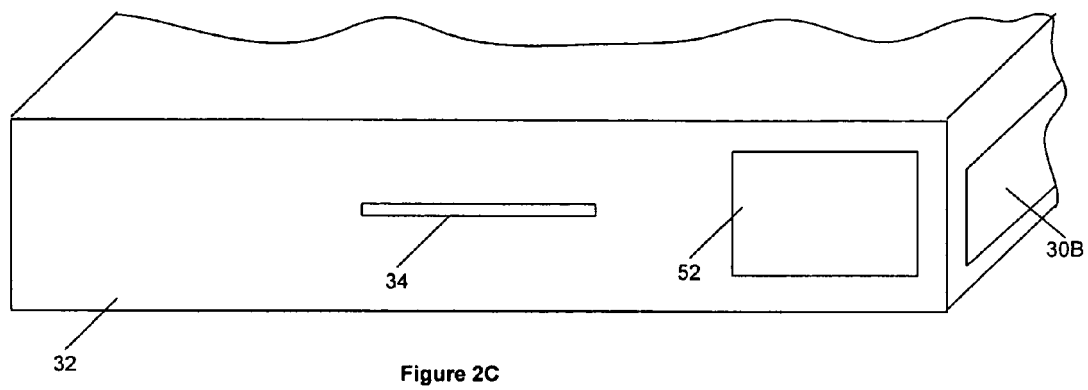
FIG. 2C is a cross-sectional view of an exemplary front panel associated with a KVM drawer in accordance with another aspect of the present invention.
Figure 2B:
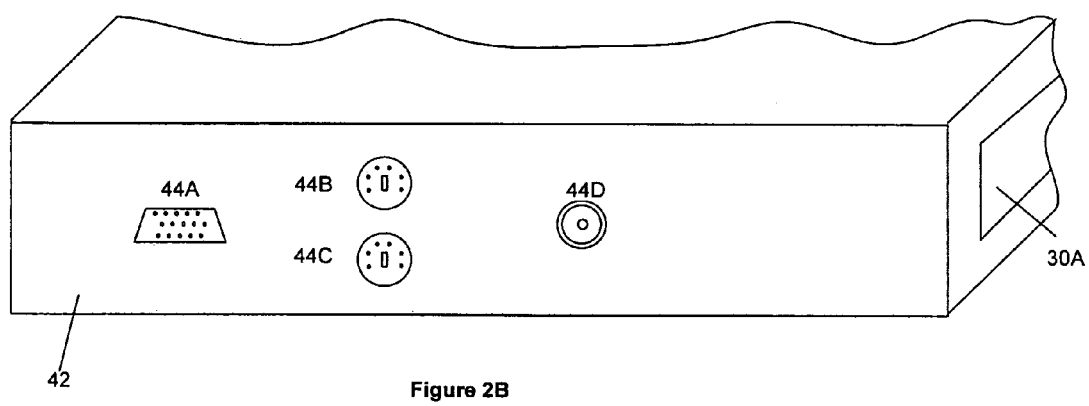
FIG. 2B is a cross-sectional view of an exemplary rear panel for a KVM drawer in accordance with one aspect of the present invention.

FIG. 2B illustrates an exemplary back panel 42 associated with the KVM drawer 28. The back panel 42 can be secured to the KVM drawer by any suitable means. The back panel 42 generally includes openings for a variety of ports 44A-44D to provide interface between the KVM drawer 28 and a variety of peripherals, cables and/or devices. For examples the ports 44A-44D may include an internal video monitor port(s) (fifteen position D-sub) (e.g., 44A), internal mouse and keyboard port(s) (Mini-DIN) (e.g., 44B and 44C), and a DC power in port (e.g., 44D). Other ports may include for example, USB, Firewire, PCI, wireless interfaces, optical ports, Ethernet and so forth. At least one port for transmitting and receiving user interface and video information is generally made accessible on the back panel 42 to facilitate communicating the information to other devices (e.g., host computers, switches, hubs, controllers, etc.). One of ordinary skill in the art will readily appreciate that the back panel 42 may include any type of port that may be used to facilitate communications between the KVM drawer 28 and any other device.

Referring back to FIG. 2A, the KVM drawer 28 may also include a video monitor or display 46 and at least one user input device (e.g., keyboard 48, computer mouse 50 (also referred to herein as a "pointing device"). As used herein, the term "keyboard" includes any conventional computer keyboard, including illuminating keyboards, as well as any keypad entry device. Likewise, the term "mouse" includes any conventional computer mouse, any pointing device, a trackball, a touch pad, a thumbwheel, an illuminated touch pad, etc. In certain limited circumstances, a video monitor 46 may also be referred to as a user input device (e.g., when the computer monitor is a touch screen device). The keyboard 48 and the computer mouse 50 may be integrated into the KVM drawer 28 or may be externally coupled to the KVM drawer 28.

The KVM drawer 28 illustrated in FIG. 2A, may include an identification input device 52 integrated into the user input housing 38. The identification input device 52 is capable of receiving biometric markers associated with a potential user. The KVM drawer 28 generally requires a user to authenticate him or herself by inputting biometric information in the form of biometric markers using the identification input device 52. If the user is unable to properly authenticate him or herself, the user is generally not granted assess to the KVM drawer 28. If the user is properly authenticated, the user is provided access to the KVM drawer 28.

The identification input device 52 may be also integrated externally from the KVM drawer 28. For example, the identification input device 52 also may be located on the front panel 32 of the KVM drawer 28, as shown in FIG. 2C. In such cases, the KVM drawer may not be accessible to the user until the user is biometrically authenticated. For example, the user may have to be biometrically authenticated before the user opens the drawer containing the KVM drawer 28. Once authenticated, the user may gain access to the KVM drawer 28 by sliding the KVM drawer 28 out from the covering of the rack storage system 10. For example, a locking mechanism (not shown) can secure the KVM drawer 28 to the rack storage system 10 until a user is properly authenticated. One of ordinary skill in the art will readily appreciate that identification input device 52 may be located in any location, (e.g., internally or externally located in relation to the KVM drawer 28), and that a variety of security measures may be taken to prevent an authenticated user from tampering with the KVM drawer 28.

Biometric markers used for authentication and identification of authorized users may include measurements of unique visible features such as fingerprints, hand and/or face geometry, and retinal and/or iris patterns, as well as the measurement of unique behavioral responses such as the recognition of vocal patterns and the analysis of hand movements. The use of each of these biometric markers requires a device to make the biological measurement and process it in electronic form. The device may measure and compare the unique spacing of the features of a person's face or hand and compare the measured value with a value stored in memory or a storage device component (e.g., disk drive, volatile or non-volatile memory, etc.) associated with the device. Where the measured values match the stored values, the person is identified or authorized.

Several types of technologies are used in biometric identification of superficial anatomical traits. For example, biometric fingerprint identification systems may require the individual being identified to place his or her finger on a visual scanner. The scanner reflects light off of the person's finger and records the way the light is reflected off of the ridges that make up the fingerprint. Hand and face identification systems use scanners or cameras to detect the relative anatomical structure and geometry of the person's face or hand. Different technologies are used for biometric authentication using the person's eye. For retinal scans, a person will place his or her eye close to or upon a retinal scanning device. The scanning device will scan the retina to form an electronic version of the unique blood vessel pattern in the retina. An iris scan records the unique contrasting patterns of a person's iris.

Still other types of technologies are used for biometric identification of behavioral traits. Voice recognition systems generally use a telephone or microphone to record the voice pattern of the user received. Usually the user will repeat a standard phrase, and the device compares the measured voice pattern to a voice pattern stored in the system. Signature authentication is a more sophisticated approach to the universal use of signatures as authentication. Biometric signature verification not only makes a record of the pattern of the contact between the writing utensil and the recording device, but also measures and records speed and pressure applied in the process of writing.

Figure 3A:
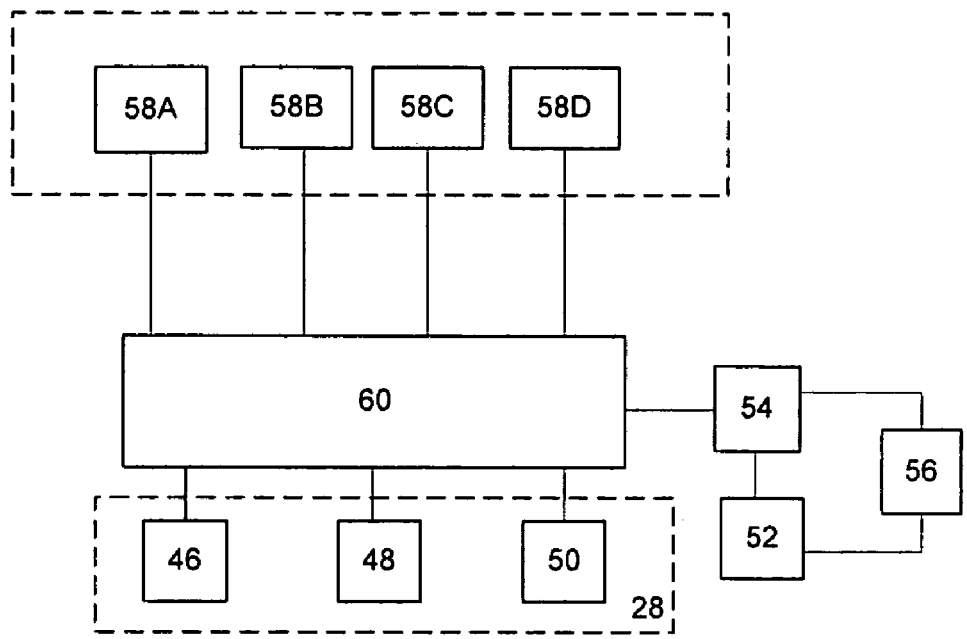
FIGS. 3A, 3B and 3C are exemplary systems in accordance with the present invention.

As shown in FIG. 3A, the identification input device 52 is communicatively coupled to an authentication module 54 (also known as a processor) and a storage device 56. Upon proper authentication, authentication module 54 permits the KVM drawer 28 to be communicatively coupled to one or more of the host computers 58A-58D through an emulation controller 60, which emulates a keyboard and mouse to the host computer(s) or KVM switch. For example, once a user is properly authenticated, the video monitor 46, keyboard 48, and mouse 50 associated with the KVM drawer 28 may be used to communicate with one or more host computers 58A-58D through the emulation controller 60. As used herein, the phrase "communicatively coupled" should be interpreted in its broadest terms to include a direct physical connection, an indirect connection and any logical connection.

The authentication module 54 provides a mechanism for the biometric information received from the identification input device 52 to be linked to or identify an authorized user of the system. The authentication module 54 analyzes at least a portion of the biometric data received from the identification input device 52 and compares the received data with data associated with authorized users of the KVM drawer 28.

Figure 3B:
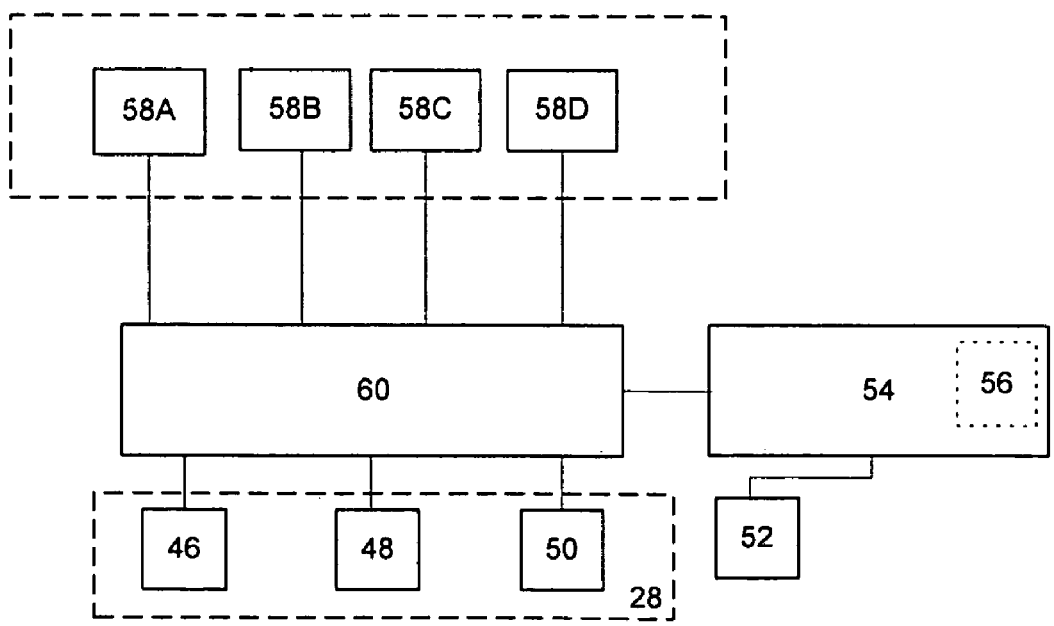

The authentication module 54 may include a self-contained storage device 56 (e.g., persistent memory) that includes a database of biometric information associated with authorized users, as shown in FIG. 3B. The storage device 56 may comprise several devices (e.g., hard disk, random access memory, read only memory, etc.) and includes, for example, multiple storage components that may include volatile and/or non-volatile memory components. Generally, at least a portion of the storage device 56 that includes the stored biometric information is resident in persistent memory.

In general, the authentication module 54 receives biometric data from a potential user of the system and processes the received data to determine if the user seeking access is authorized to access the KVM drawer 28 and/or the host computers 58A-58D. If the biometric information received at the authentication module 54 matches at least a portion of the data associated with an authorized user, the authentication module 54 transmits a control signal to the emulation controller 60 allowing the associated user to access at least one of the host computers 58x (e.g., 58A, 58B, 58C, and/or 58D). Generally, the control signal transmitted by the authentication module 54 is binary and either enables or disables the emulation controller 60. Enabling and disabling the emulation controller 60 may be accomplished by setting an external bit that is read by the emulation controller 60. The control signal may be communicated to the emulation controller 60 through a variety of communication protocols including $I^2C$ communications or any other acceptable communication link.

Figure 3C:
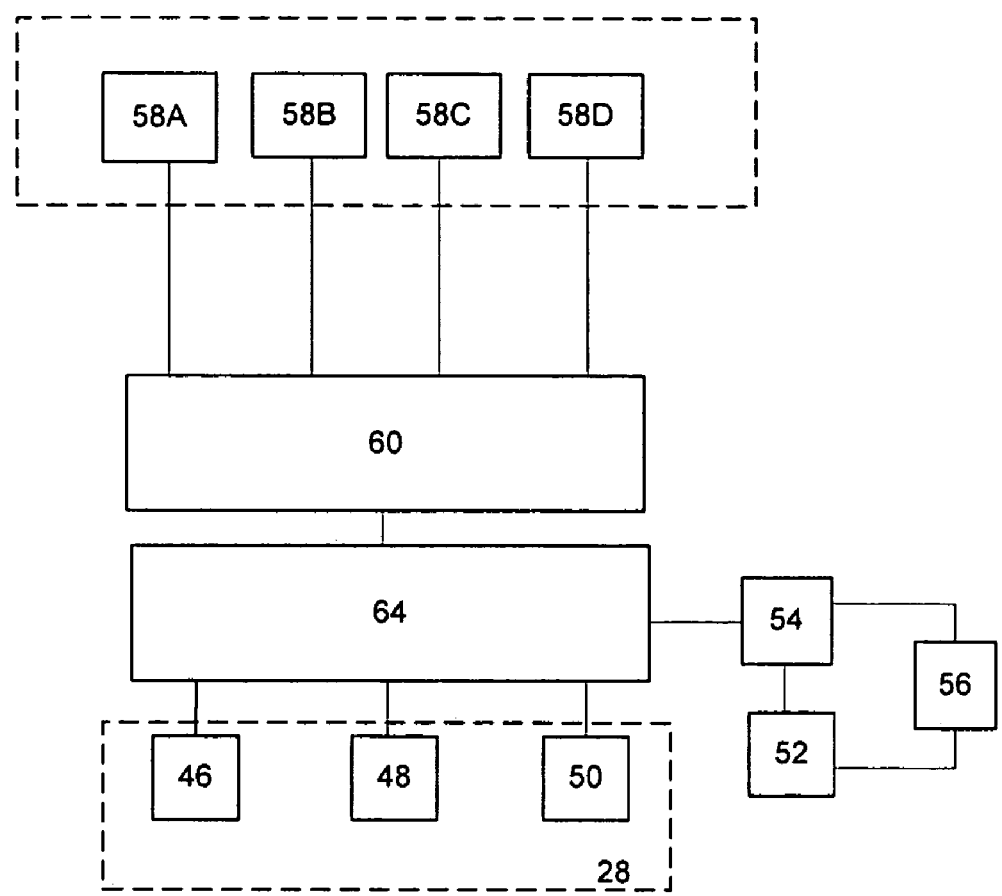

Referring to FIG. 3C, another embodiment of the invention is shown. An external input-output buffer 64 is communicatively coupled to the authentication module 54 and the emulation controller 60. Upon proper authentication from the authentication module 54, a control signal can be transmitted to the input-output buffer 64, which enables an associated user, through the KVM drawer 28, to interact with one or more host computers 58A-58D through the emulation controller 60 based on the user's security privileges. If the user is not properly authenticated, the authentication module 54 may transmit a control signal to the input-output buffer 64 that disables communications between the KVM drawer 28 and the emulation controller 60. By default, a disabling control signal is transmitted to the input-output buffer 64 until a user is properly authenticated.

The emulation controller 60 described herein is capable of routing-keyboard, video and mouse signals related to the KVM drawer to one or more host computers. Such a device may be implemented in a variety of way (e.g., a KVM switch, a microprocessor, a programmable logic controller, an ASIC, etc.). The emulation controller 60 allows communication between a KVM drawer 28 and one or more of the host computers 58A-58D. The emulation controller 60 may control switching of the KVM drawer 28 to the one or more host computers 58A-58D.

The emulation controller 60 is configured to receive and transmit messages from the host computers 58A-58D, the KVM drawer 28 and/or the input-output buffer 64. Generally, the emulation controller 60 receives keyboard, video, and mouse data from a host 58A-58D, KVM drawer 28 and/or input-output buffer 64 in the form of serial data. The emulation controller 60 generally converts the received input signals for transmission through one or more data buses (e.g., signals converted to $I^2C$ signals). The received input signals may then be re-converted and processed accordingly.

The emulation controller 60 also performs the function of emulating the user input devices (e.g., mouse, keyboard, etc.) to the host computers 58A-58D. The emulation controller 60 may emulate the exact device connected to the KVM drawer 28 or a similar generic device. The emulation controller 60 performs emulation so that the host computers 58A-58D will detect the presence of a user interface device in order to prevent system failure and user annoyances (e.g., waiting for a host computer 58A-58D to detect the user interface). In one embodiment, emulation is performed at all times to ensure connection to the hosts 58A-58D.

The emulation controller 60 may also be configured to implement security features. The emulation controller 60 may allow and disallow certain users access to one or more of the host computers 58A-58D. For example, if an associated user selects a host computer 58A-58D that the user is not authorized to access, the emulation controller 60 may either disallow the request or deny the connection request and respond back to the user that the connection cannot be made.

If an associated user has been properly authenticated, the emulation controller 60 is enabled and the associated user is able access the host computers 58A-58D, depending upon the administrative rights or privileges provided the associated user from the system administrator. If an associated user has not been properly authenticated, the emulation controller 60 may be disabled and the associated user is prevented from accessing any of the host computers 58A-58D.

Figure 4:
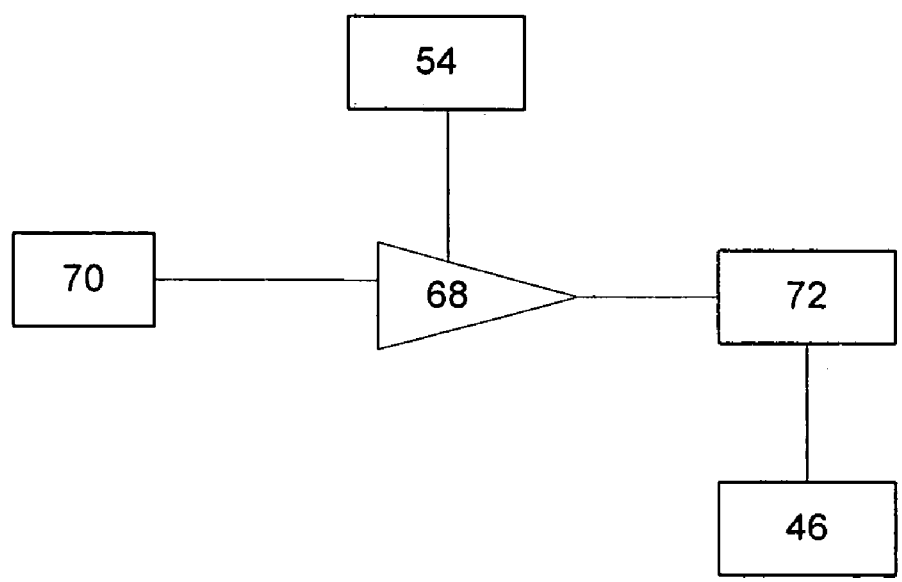
FIG. 4 is a exemplary block diagram for enabling and disabling the video signal in accordance with one aspect of the present invention.

Like the user input signals discussed above (e.g., mouse and keyboard signals), the authentication module 54 may also enable and disable the video signal through the emulation controller 60. Generally, the video signal will be disabled, thereby preventing the associated user from viewing the associated video signals, until the associated user is properly authenticated. In one embodiment illustrated in FIG. 4, the emulation controller 60 can include an operational amplifier buffer 68 that may be coupled in serial between the video input connector 70 and the video controller 72. The operational amplifier buffer 68 may receive a control signal from the authentication module 54. The control signal may set or clear the enable pin associated with the operational amplifier buffer 68. For example, if the user is properly authenticated, the operational amplifier buffer 68 is enabled and the video signal from an associated host computer 58A-58D is routed through the operational amplifier buffer 68 to video controller 72 resulting in an image displayed on a video monitor 46. If the user fails to properly authenticate him or herself, the operation amplifier buffer 68 remains disabled and the user is not permitted to view the video signal associated with an associated host computer 58A-58D.

The authentication module 54, the emulation controller 60, input-output buffer 64, operational amplifier buffer 68, and/or storage device 56 can take the form of separate components, combined or implemented as part of a single or multiple components (or any combination thereof (e.g., a microprocessor, a programmable logic controller, an ASIC, etc.).

Upon successful biometric authentication, the associated user is permitted access, based on access rights, to one or more host computers 58A-58D. Host computers 58A-58D may take a variety of forms, including: a personal or laptop computer running a Microsoft Windows operating system, a PalmOS operating system, a UNIX operating system, a Linux operating system, a Solaris operating system, an OS/2 operating system, a BeOS operating system, a MacOS operating system, a VAX VMS operating system, or other operating system or platform. Host computers 58A-58D may further include a microprocessor such as an Intel x86-based or Advanced Micro Devices x86-compatible device, a Motorola 68K or PowerPC device, a MIPS device, Hewlett-Packard Precision device, or a Digital Equipment Corp Alpha RISC processor, a microcontroller or other general or special purpose device operating under programmed control. Likewise, host computers 58A-58D may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons of ordinary skill in the art.

As one of ordinary skill in the art will readily appreciate, the process of authentication may vary for the present invention depending on the precise topology employed. While various aspects of the invention were illustrated in FIGS. 1-4, one of ordinary skill in the art should appreciate that the topologies discussed above may be modified and/or combined. Regardless of the exact topology employed, the authentication process can substantially remain the same.

Figure 5:
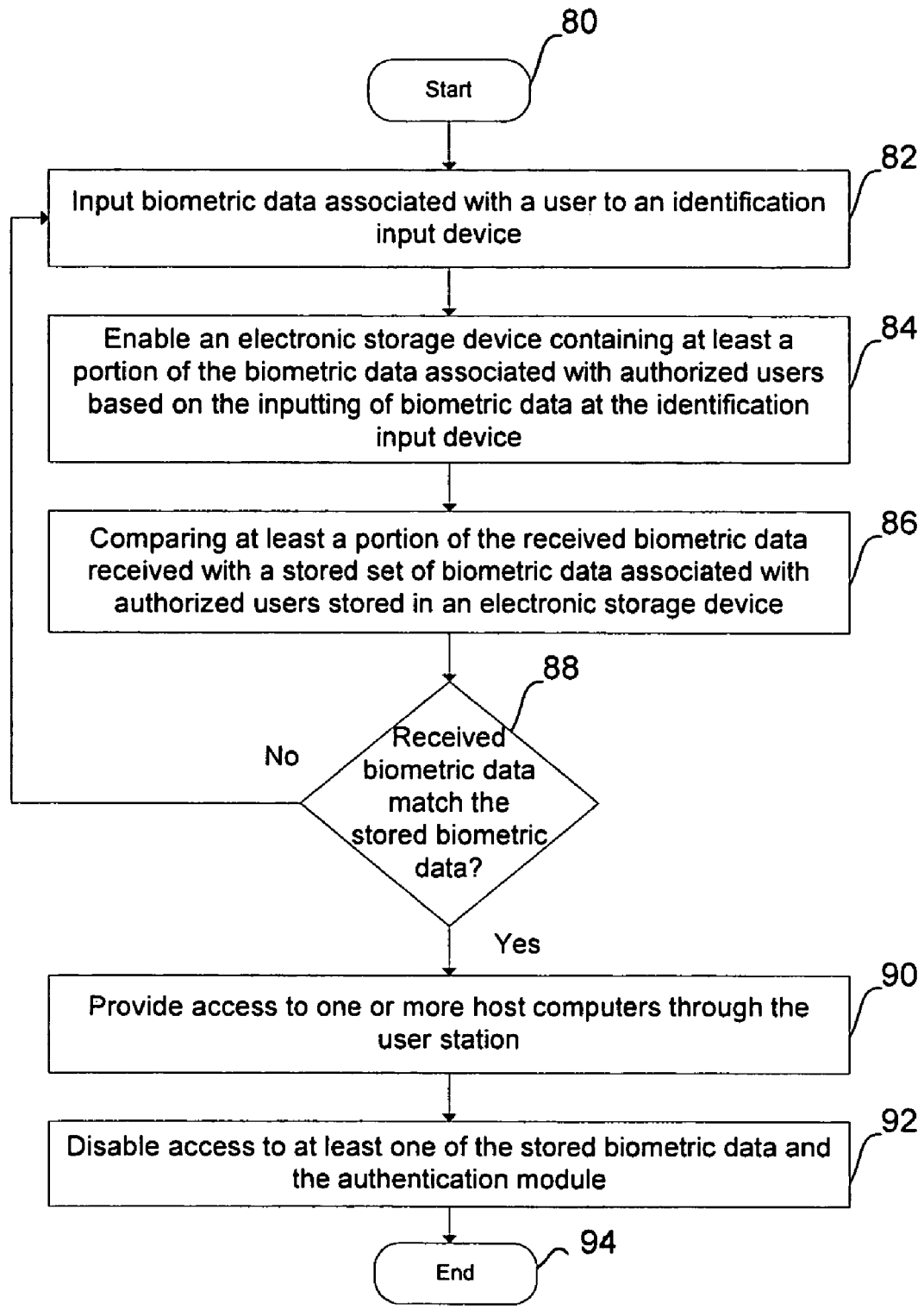
FIG. 5 is a flow chart illustrating a method in accordance with the present invention.

Turning now to FIG. 5, the authentication process for the KVM drawer 28 is illustrated in flow chart form. The process begins at start block 80, from which progression is made to process block 82. At process block 82, the associated user inputs biometric data associated with the user to the identification input device 52. Progression then continues to process block 84. At process block 84, user activity detected at the identification input device 52 enables storage device 56, which contains the biometric data associated with authorized users. Progression then continues to process block 86. At process block 86, the authentication module 54 queries the storage device 56 and compares at least a portion of the received biometric data from the identification input device 52 with the stored biometric data associated with authorized users.

Progression then continues to decision block 88, wherein a determination is made as to whether the received biometric data matches at least a portion of the stored biometric data associated with authorized users. A positive determination at decision block 88 causes progression to process blocks 90 and 92. Process block 90 grants the associated user access to the KVM drawer 28. Process block 92 disables the authentication module 54 and associated storage device 56 may be disabled to prevent individuals hacking into the stored biometric data. Progression is then made to termination block 94, which exits the authentication process.

If the received biometric data does not match at least a portion of the stored biometric data associated with authorized users, a negative determination is made at decision block 88. In such case, the associated user is not granted access to the KVM drawer 28 and the user may attempt to repeat the step of inputting biometric data set forth in process steps 82-86.

One of ordinary skill in the art will readily appreciate that the step of disabling at least one of the authentication module 54 and the storage device 56 may occur before providing the user with access to one or more of the host computers.

Upon successful authentication, the user will have access to the host computers 58A-58D through the KVM drawer 28. In one embodiment, upon proper authentication, the user will be connected to a predetermined host computer upon authentication based upon the host computer most frequently utilized by user and/or last visited by the user. In another embodiment, the user will be prompted to identify the host computer he or she seeks access when the user presents her or himself to the identification input device 52. If the user is unable to be properly authenticated, the un-authorized user is prevented from accessing the host computers associated with the emulation controller 60. One of ordinary skill in the art will readily appreciate that there are a variety of ways for a user to identify which host computer the user seeks to access (e.g., a software interface may be used to implement a selection mechanism or a hardware interface, such as a push button located on or near the identification input device 52, may be similarly be used). Likewise, a user that is unable to be properly authenticated may be provided access to an un-secure host computer or alternatives designated by the network administrator.

When transmitting biometric data between the identification input device 52 and the authentication module 54, the biometric data may or may not be encrypted depending on the security policy of the network administrator. Likewise, information received and transmitted between the host computers 58A-58D and KVM drawer 28 may or may not be encrypted. Sensitive information (e.g., biometric log-in information and confidential data input by the user or stored on host computers 58A-58D) may be encrypted using any encryption algorithm (e.g., SSH, PGP, DES, or 3DES) to prevent unauthorized users from having access to the confidential information.

It should be readily apparent to those of ordinary skill in the art that the particular interface between the authentication module 54 and the system described herein can take many forms and can be programmed and implemented by someone of ordinary skill in art. For instance, the interface can be written in computer code and stored, in whole or in part, on in the authentication module 54, the emulation controller 60, the KVM drawer 28, the identification input device 52, or any other device which the developer deems appropriate.

Access to the host computers in this embodiment and/or in the other embodiments described herein may expire when a user logs off or when KVM drawer and/or input device associated with the KVM drawer indicates that there has not been user activity associated with a given KVM drawer for a predetermined period of time. Once a session has expired, a user is required to re-authenticate him or herself in order to regain access to the host computers 58A-58D through the emulation controller 60. In addition, a user may be restricted access to system based on the time of day. For instance, a user may only be given access to a given host computer during normal business hours.

It should be appreciated that the above described system and methods provide for users to be authenticated using unique biometric data in order to gain access to at least one host computer associated with an emulation controller. Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A system for permitting a user to access one or more host computers, the system comprising:
   a KVM drawer including a video monitor, a user input device, and a pointing device, wherein the KVM drawer is supported by an associated rack;
   an emulation controller communicatively coupled to the KVM drawer and one or more host computers;
   an identification input device for receiving biometric data associated with an associated user; and
   an authentication device communicatively coupled to the emulation controller and to the identification input device, wherein the authentication device is capable of providing the associated user access to the one or more host computers based at least in part upon the biometric data received from the identification input device; and
   a storage device communicatively coupled to the authentication device, wherein the storage device includes a set of reference data for associating the associated user with a set of unique biometric data, wherein the set of reference data is stored in an encrypted format.

2. The system of claim 1, wherein the user input device includes a keyboard.

3. The system of claim 2, wherein the keyboard is an illuminated keyboard.

4. The system of claim 1, wherein the pointing device consists of at least one from the group of a computer mouse, a touch pad, a track ball and a touchscreen.

5. The system of claim 4, wherein the pointing device is an illuminated pointing device.

6. The system of claim 1, wherein the biometric data is obtained from at least one of a fingerprint scan of the user, a retinal scan of the user, a sampling of the user's DNA, a sampling of the user's voice, a sampling of the user's breath, or a sampling of the user's handwriting.

7. The system of claim 1 wherein the biometric data includes a unique set of information pertaining to authorized users of the one or more host computers.

8. The system of claim 1, wherein the storage device is a persistent memory device.

9. The system of claim 1, wherein the storage device is housed within the authentication device.

10. The system of claim 1, wherein the storage device is housed externally from the authentication device.

11. The system of claim 1, wherein the set of reference data is inaccessible after user authentication.

12. The system of claim 1, wherein the identification input device and the authentication module are integrally housed.

13. The system of claim 1, wherein the emulation controller, the identification input device and the authentication module are integrally housed.

14. A system for permitting a user to access one or more host computers, the system comprising:
  a KVM drawer including a video monitor, a user input device, and a pointing device, wherein the KVM drawer is supported by an associated rack;
  an input-output buffer communicatively coupled to the KVM drawer;
  an emulation controller communicatively coupled to the input-output buffer and one or more host computers;
  an identification input device for receiving biometric data associated with the user seeking access to the KVM drawer; and
  an authentication device communicatively coupled to the input-output buffer and to the identification input device, wherein the authentication device is capable of providing an associated user access to the one or more host computers based at least in part upon the received biometric data from the identification input device; and
  a storage device communicatively coupled to the authentication device, wherein the storage device includes a set of reference data for associating the associated user with a set of unique biometric data, wherein the set of reference data is stored in an encrypted format.

15. The system of claim 14, wherein the user input device includes a keyboard.

16. The system of claim 15, wherein the keyboard is an illuminated keyboard.

17. The system of claim 14, wherein the pointing device consists of at least one from the group of a computer mouse, a touch pad, a track ball and a touchscreen.

18. The system of claim 17, wherein the pointing device is an illuminated pointing device.

19. The system of claim 14, wherein the biometric data is obtained from at least one of a fingerprint scan of the user, a retinal scan of the user, a sampling of the user's DNA, a sampling of the user's voice, a sampling of the user's breath, or a sampling of the user's handwriting.

20. The system of claim 14 wherein the biometric data includes a unique set of information pertaining to authorized users of the one or more host computers.

21. The system of claim 14, wherein the storage device is a persistent memory device.

22. The system of claim 14, wherein the storage device is housed within the authentication device.

23. The system of claim 14, wherein the storage device is housed externally from the authentication device.

24. The system of claim 14, wherein the set of reference data is inaccessible after user authentication.

25. The system of claim 14, wherein the identification input device and the authentication module are integrally housed.

26. The system of claim 14, wherein the emulation controller, the identification input device and the authentication module are integrally housed.

27. The system of claim 14, wherein upon successful authentication, the input-output buffer is enabled by the authentication device, until a session initialized by the associated user has terminated.

28. A KVM drawer comprising: a video monitor housing for supporting a video monitor; a user input housing pivotally connected to the video monitor housing, wherein the user input housing includes at least one user input device and the user input housing is capable of being secured on an associated rack;
  the user input housing including a rear panel including one or more ports for communicatively coupling the video monitor and the at least one user input device to one or more host computers through an emulation controller;
  wherein access to the one or more host computers through the at least one of the user input device and the video monitor is controlled by an associated authentication device that provides an associated user access to the one or more host computers based at least in part upon information biometric data received from the associated user, and
  wherein a set of reference data for the associated user is stored in an encrypted form in a storage device communicatively coupled to the authentication device, for providing access to the one or more host computers based at least in part on a comparison with the received biometric data and the set of reference data.

29. A method for permitting a user to access one or more host computers based upon biometric data associated with an authorized user, the method comprising:
  inputting biometric data associated with a user to an identification input device;
  enabling a storage device containing at least a portion of the biometric data associated with authorized users based on the inputting of biometric data at the identification input device, wherein the biometric data is stored in the storage device in an encrypted form;
  comparing at least a portion of the received biometric data with a stored set of biometric data associated with authorized users stored in the storage device;
  providing access to at least one host computer from a KVM drawer through an emulation controller based upon the step of comparing the received biometric data with the stored set of biometric data associated with authorized users.

30. The method of claim 29, wherein the biometric data is obtained from at least one of a fingerprint scan of the user, a retinal scan of the user, a sampling of the user's DNA, a sampling of the user's voice, a sampling of the user's breath, or a sampling of the user's signature.

31. The method of claim 29 wherein the biometric data includes a unique set of information pertaining to authorized users of the one or more host computers.

32. A method for permitting a user to access one or more host computers based upon biometric data associated with an authorized user, the method comprising:
   inputting biometric data associated with a user to an identification input device;
   enabling a storage device containing at least a portion of the biometric data associated with authorized users based on the inputting of biometric data at the identification input device;
   comparing at least a portion of the received biometric data with a stored set of biometric data associated with authorized users stored in a storage device;
   providing access to at least one host computer from a KVM drawer through an emulation controller based upon the step of comparing the received biometric data with the stored set of biometric data associated with authorized users; and
   disabling the storage device upon providing an associated user access to one or more host computers.

* * * * *